United States Patent [19]

Oishi

[11] Patent Number: 4,812,939
[45] Date of Patent: Mar. 14, 1989

[54] MAGNETIC RECORDING DISC HAVING TENSIONED AND ELASTICALLY-SUPPORTED RECORDING SURFACE

[75] Inventor: Kengo Oishi, Kanagawa, Japan

[73] Assignee: Fuji Photo Film Company, Kanagawa, Japan

[21] Appl. No.: 889,716

[22] Filed: Jul. 28, 1986

[30] Foreign Application Priority Data

Aug. 3, 1985 [JP] Japan .................. 60-119604[U]

[51] Int. Cl.⁴ .............................................. G11B 5/82
[52] U.S. Cl. ................................................. 360/135
[58] Field of Search .......................... 360/135, 97–99; 346/137; 428/65; 369/287, 288, 280

[56] References Cited

U.S. PATENT DOCUMENTS

| | | | |
|---|---|---|---|
| 3,805,292 | 4/1974 | Hashiguchi et al. | 360/135 |
| 4,555,716 | 11/1985 | Odawara | 346/137 |
| 4,623,570 | 11/1986 | Alexander et al. | 360/135 X |
| 4,631,609 | 12/1986 | Erickson et al. | 360/135 |

FOREIGN PATENT DOCUMENTS

| | | | |
|---|---|---|---|
| 938095 | 9/1963 | United Kingdom | 360/135 |
| 1005103 | 9/1965 | United Kingdom | 360/135 |

Primary Examiner—John H. Wolff
Attorney, Agent, or Firm—Sughrue, Mion, Zinn, Macpeak & Seas

[57] ABSTRACT

A magnetic recording disc having a rigid substrate disc is provided with an annular recess defined between inner and outer peripheral bonding rings. One or more annular elastic discs having a thickness slightly larger than the depth of the recess is placed therein. A flexible disc sheet is placed over the arrangement and held tight against the peripheral bonding rings while the inner and outer edges of the flexible disc sheet are bonded to the bonding rings. As a result, the flexible disc sheets are constantly tensioned as the elastic discs exert constant expansion pressure on the non-exposed surface of the flexible disc sheets. The recording and reproducing regions of the disc are, therefore, elastically supported by the elastic disc from below.

9 Claims, 2 Drawing Sheets

MAGNETIC RECORDING DISC HAVING TENSIONED AND ELASTICALLY-SUPPORTED RECORDING SURFACE

BACKGROUND OF THE INVENTION

1. Field of the Invention

This utility model relates to a magnetic disc for magnetic recording in a direction parallel to or perpendicular to its surface.

2. Background Art

One example of a conventional magnetic disc is a rigid magnetic disc. The substrate of the rigid magnetic disc is made of rigid material. In general, the rigid magnetic disc employs an aluminum substrate (JIS A5086 for instance).

The rigid magnetic disc is generally formed as follows. An aluminum plate is machined on a lathe, and its surface is polished so that a data recording operation can be performed at high density because the space between the disc and the head is minimized. Thereafter, a magnetic layer is formed on the aluminum substrate by vacuum deposition or spin coating. For high density recording and reproducing, the surface of the disc should be smooth. However, it has been difficult for the conventional magnetic disc using the aluminum substrate to have a surface with a central line average roughness Ra of not more than 0.1 micrometers. Furthermore, since the substrate is rigid, in forming the magnetic layer, the continuous coating is limited by the web pass. That is, handling of the conventional rigid substrate is rather troublesome. On the other hand, a high density recording operation is greatly affected by the dust on the disc. Therefore, it is essential to manufacture magnetic discs in a dust-proof environment. Accordingly, the magnetic disc manufacturing process is considerably intricate, thus requiring an enormous sum of investment in equipment.

The conventional substrate, such as an aluminum substrate, is rigid. Therefore the head should not contact the magnetic layer in tracing it. However, it is difficult to maintain constant the narrow space between the head and the magnetic layer, and therefore signal errors frequently occur. Further, it is very difficult to further reduce the space between the head and the disc surface to thereby increase the recording density. If the magnetic head is accidentally brought into contact with the disc during the tracing operation with the narrow space maintained, a sliding frictional force is produced because the substrate is rigid. As a result of this frictional engagement, a great impact is applied collectively to the part of the magnetic layer which has contacted the head, so much so as to break the disc surface, thus reducing the service life of the disc.

Furthermore, the aluminum substrate polished as described above is expensive.

On the other hand, a magnetic disc as shown in FIG. 1 has been proposed in the art. In this magnetic disc, recesses are formed in both sides of a disc substrate 1, and floppy discs or flexible discs 2 (hereinafter referred to as "flexible disc sheets") having a magnetic layer on one side are bonded on both sides of the substrate 1 in such a manner that the magnetic layers are exposed on the exterior of the disc and gaps 3 are formed between the substrate 1 and the inner surface of the flexible disc sheets 2.

The magnetic recording surfaces of the magnetic disc thus constructed are flexible. Therefore, even when the head is accidentally brought into contact with the magnetic recording surface, or when a higher density recording operation is carried out with the head held in contact with the magnetic recording layer, the magnetic layer is scarcely broken, unlike that of the rigid disc. Accordingly, the technique of flexible discs can be utilized as it is. Furthermore, a smooth magnetic layer that is highly durable can be used as a magnetic disc's magnetic layer. Thus, this type of magnetic disc is being watched with great interest since it eliminates the difficulties accompanying a conventional rigid magnetic disc.

The inventors have conducted intensive research on the magnetic disc of this type, and found that it still suffers from serious difficulties. That is, in the case where the flexible disc sheets are only bonded on the substrate as shown in FIG. 1, the flexible disc sheets may relax into a curved shape, may not be satisfactorily bonded to the substrate, or may be creased.

SUMMARY OF THE INVENTION

Accordingly, an object of this invention is to eliminate the above-described difficulties accompanying a conventional magnetic disc.

More specifically, an object of the invention is to provide a magnetic disc in which the flexible disc sheets are maintained satisfactorily taut or tensioned at all times.

The foregoing object of the invention has been achieved by a magnetic disc in which flexible disc sheets are bonded on both sides of a substrate with gaps between the sheets and the substrate. According to the invention, in each of the gaps, an annular elastic member is provided along at least one of the inner and outer peripheral walls which define the gap, in such a manner that the annular elastic member elastically supports the respective flexible disc sheet.

DETAILED DESCRIPTION OF THE PREFERRED EMBODIMENTS

One embodiment of this utility model will be described with reference to the accompanying drawings in detail.

Figure 2:
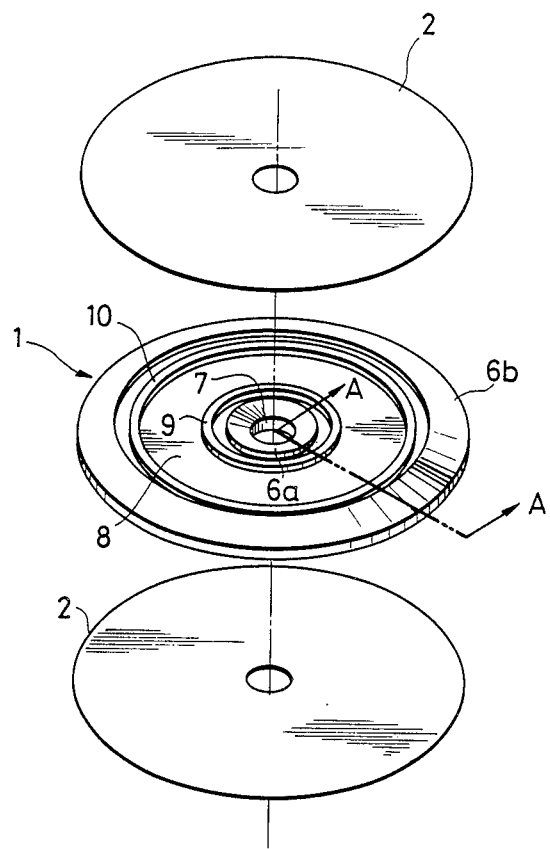
FIG. 2 is an exploded perspective view showing one embodiment of this utility model.

A magnetic disc according to the invention, as shown in FIG. 2, is formed by bonding flexible disc sheets 2 on both sides of a substrate 1. The substrate 1 has a central hole 7 into which a disc rotating rotary shaft (spindle) is inserted. The substrate 1 is relatively large in thickness so as to be rigid. The substrate 1 further has on both sides an inner peripheral bonding ring 6a around the central hole 7, and an outer peripheral bonding ring 6b in such a manner that annular recesses 8 are formed between the two bonding rings 6a and 6b. Preferably, both of the bonding rings 6a and 6b have inclined surfaces which slope upwards toward the recesses 8. Annular elastic members 9 and 10 are arranged along the inner and outer walls of each of the annular recesses 8, respectively.

Figure 1:
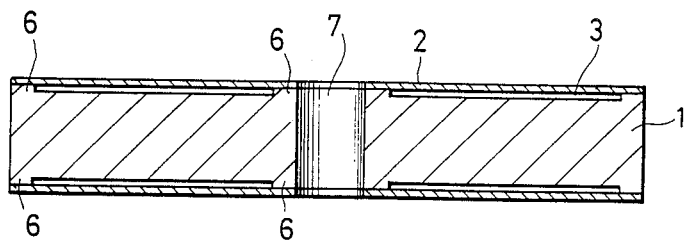
FIG. 1 is a sectional view outlining the fundamental construction of a magnetic disc to which the technical concept of the utility model is applied.
Figure 3:
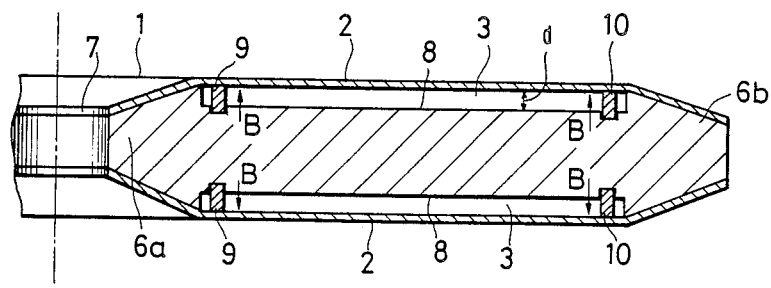
FIG. 3 is an enlarged sectional view taken along line A—A in FIG. 2.

The annular elastic members 9 and 10 are fitted in annular grooves, shown in FIG. 3, formed parallel to but spaced closely to the inner and outer walls of each of the upper and lower annular recesses 8. The upper end surfaces of the annular elastic members 9 and 10, when the annular elastic member is fitted in the grooves, are slightly higher than the bonding rings 6a and 6b as shown in FIG. 3. That is, the flexible disc sheets 2 which are thereafter bonded on the bonding rings 6a and 6b are pushed outwardly from the substrate 1. It goes without saying that the annular elastic members 9 and 10 are so arranged as to support the parts of the flexible disc sheets 2 which are other than the recording and reproducing regions thereof.

The annular elastic members 9 and 10 may be made of coiled metal springs. Alternatively, they may be formed by using a plastic resin, such as polyethylene, relatively high in the modulus of elasticity. That is, the annular elastic members 9 and 10 may be made of any material which meets the operational conditions of the magnetic disc. The inside diameter and the outside diameter of the substrate 1, and the dimensions of the peripheral bonding parts 6a and 6b can be freely determined according to the purpose of using of the magnetic disc.

The material of the substrate 1 should first of all be such that the substrate is not thermally deformed during heat treatment. Accordingly, a metal such as aluminum or aluminum alloy, glass, a polymer which causes no thermal deformation, at least during heat treatment, and combinations of these materials can be employed to form the substrate 1.

Next, it is essential that the material be inexpensive. A polymer substrate is generally low in manufacturing cost because it can be mass-produced by injection molding. In the invention, as is apparent from FIG. 3, owing to the provision of the gaps 3, the magnetic layers are not affected by the surface roughness of the substrate. Therefore, even if the substrate 1 is made of aluminum, which is a typical metal, the accuracy of polishing the substrate may be relatively low, and therefore the polishing cost is also low.

In the invention, the flexible disc sheet 2 may be made of the material which is used for manufacturing so-called "floppy discs". The support on which the magnetic layer of the flexible disc sheet 2 is formed may be made of plastic film such as polyethylene terephthalate film of biaxial orientation (PET).

It is preferable that the central roughness Ra of the side of the support of the flexible disc sheet 2 on which the magnetic layer is formed is not more than 0.1 micrometers. Employing this support can increase the recording density of the magnetic disc manufactured.

If, in the flexible disc sheet 2, both sides of the support are made smooth, then the friction is increased, as a result of which two sheets are liable to stick together, and therefore it is rather difficult to handle the sheet during the manufacture of the magnetic disc. Such a support is also expensive.

However, if the surfaces of the disc support are rough, then the previously mentioned gap between the head and the disc surface is increased when the magnetic layer is formed. That is not suitable for high density recording. Accordingly, it is desirable that the magnetic layer is formed on a smooth side of the support, the other side of which is rough.

The magnetic layer may be formed on the support by coating it with magnetic iron oxide or ferromagnetic alloy powder and binder, or it may be formed on the support by vacuum deposition, sputtering or ion plating. That is, it may be formed by various methods of vapor deposition or plating.

The gaps 3 are formed for two purposes. First, when the magnetic layer of the flexible disc sheet 2 is brought into contact with the head, the frictional force is dispersed to increase the durability. Secondly, the magnetic layer suitably contacts the head so as to reduce the gap between the head and the magnetic layer to thereby permit high density recording. The depth d of the gaps 3 is preferably at least 0.15 millimeter with a view to the use of the magnetic disc. Also, it is preferable that the radial length of each gap 3 be 45% to 75% of a radius of the substrate 1. More preferably, the radial length of the gaps 3 is 50% to 65% of the radius of the substrate 1.

In the invention, the thickness of the substrate 1 is 1 to 5 millimeter, and the thickness of the flexible disc sheets 2 bonded to the substrate 1 is generally 10 to 100 micrometers. Since the dimensional stability of the magnetic disc depends on that of the substrate 1, it is preferable to use the substrate which has excellent dimensional stability.

The adhesive used to bond the disc sheet 2 to the substrate 1 may be a thermo-setting adhesive or a radiation setting adhesive, such as an electron setting adhesive or an ultraviolet-ray setting adhesive. In order to facilitate the bonding operation, it is preferable to coat one or both of the sheet bonding surfaces with a polymer such as polyester or polycarbonate or to subject them to physical surface treatment such as corona discharge, glow discharge or flame treatment.

In the magnetic disc of the invention, the flexible disc sheets 2 are bonded on the substrate 1 as shown in FIG. 3. Furthermore, in the bonding process, the annular elastic members 9 and 10 are compressed by the flexible disc sheets 2 during the manufacture of the magnetic disc. Therefore, in the case where, in the flexible disc sheets 2, the resin of the flexible disc sheets relaxes or when the magnetic disc is used over a long period, the annular elastic members 9 and 10 expand vertically of the substrate (as indicated by the arrow B in FIG. 2) to prevent the flexible disc sheets 2 from being slackened. An example of these physical distortions is the case where a variation of temperature or humidity expands or contracts the substrate 1 which is of a material different from that of the flexible disc sheets 2. The difference in thermal expansion properties is absorbed by the expansion or contraction of the annular elastic members 9 and 10, so that the flexible disc sheets 2 are maintained tight or tensioned at all times.

In the above-described embodiment, the annular elastic members 9 and 10 are made of plastic resin. However, the invention is not limited thereto or thereby. For instance, the elastic members 9 and 10 may be made of form storage or shape memory alloy, to absorb the difference in expansion and contraction between the substrate 1 and the flexible disc sheet 2 due to the variation of temperature or humidity. A form storage alloy is an alloy that remembers a former shape and reassumes that shape after passing a transition temperature. An example is Nitinol, developed by the U.S. Naval Ordnance Laboratory.

In the above-described embodiment, the annular elastic members are arranged along the inner and outer walls of the annular recesses 8. More preferably, the elastic members should be located outside the effective recording area of the disc sheet 2. Each of the elastic members should be located 2 mm or more outside the recording area edge of the disc sheet 2. However, the invention is not limited thereto or thereby. That is, satisfactory results can be obtained by providing the annularelastic members along the inner walls only, or the outer walls only.

As was described above for the magnetic disc of the invention, the annular elastic members, provided in the gaps formed between the substrate an the flexible disc sheets, elastically support the flexible disc sheets. Therefore, the flexible disc sheets are prevented from being slackened with the lapse of time and from deteriorating in tightness by the variation of temperature or humidity. Furthermore, the adverse effect of the creases on the recording and reproducing region which are liable to be formed in the bonding parts of the flexible disc sheets in bonding the disk sheets to the substrate can be prevented.

Thus, in the magnetic disc of the invention, the flexible disc sheets are maintained suitably tight or tensioned at all times, so that the surfaces of the flexible disc sheets can be satisfactorily held against the head.

What is claimed is:

1. A recording disc, comprising:
    a substrate having on at least one principal surface an annular recess formed between inner and outer annular rings;
    at least one annular elastic member disposed between said inner and outer annular rings of said annular recess, said at least one annular elastic member being disposed adjacent a wall formed by one of said inner and outer annular rings and said recess and having a height which is greater than a height of said wall; and
    a flexible recording sheet on said at least one principal surface, said flexible recording sheet covering and compressively contacting said at least one annular elastic member and being bonded to said substrate in a vicinity of both said inner and outer annular rings such that said bonded flexible recording sheet is elastically supported and kept under tension by said annular elastic member, wherein a gap is formed between said flexible sheet and a bottom surface of said recess.

2. A recording disc as recited in claim 1, wherein:
    said substrate is circular and has two principal surfaces on which respective annular recesses are formed between respective inner and outer annular rings, a respective said annular elastic member being disposed in each one of said respective annular recesses, and a respective flexible recording sheet being provided on each of said principal surfaces.

3. A recording disc as recited in claim 1, wherein:
    two annular elastic members are disposed between said inner and outer annular rings of said annular recess, respective annular elastic members being disposed adjacent respective inner and outer walls formed by said rings and said recess; and
    said recording sheet compressively contacts each of said annular elastic members.

4. A recording disc as recited in claim 3, wherein:
    said recess has formed at said bottom surface two annular grooves adjacent respective ones of said walls; and
    said elastic members are partially disposed within respective ones of said grooves.

5. A recording disc are recited in claim 1, wherein:
    said recess has formed at said bottom surface an annular groove adjacent said wall; and
    said elastic member is partially disposed within said groove.

6. A recording disc as recited in claim 1, wherein said recording sheet comprises a flexible support coated with a recording material, a surface roughness of said recording material coated on said support being less than that of remaining surfaces of said support not being coated with said recording material.

7. A recording disc as recited in claim 1, wherein said annular elastic member is constructed of material which comprises an elastic plastic resin.

8. A recording disc as recited in claim 1, wherein said annular elastic member is constructed of material which comprises a form storage alloy.

9. A recording disc, comprising:
    a substrate having formed on two opposed principal surfaces, respective annular recesses being defined between a radially inner annular supporting ring and an opposed radially outer annular supporting ring, each recess having a substrate wall and two side walls corresponding to opposing surfaces of said opposing supporting rings, each said recess also having two annular grooves formed in said substrate wall of said recess adjacent but spaced apart from said side walls;
    four annular elastic members, each annular elastic member being disposed in a respective one of said annular grooves and having a height extending in an uncompressed state above a height of said side walls;
    two flexible recording sheets, a respective recording sheet being on each of said opposing principal surfaces, each said recording sheet being bonded on opposite principal surfaces of said substrate to surfaces of said supporting rings and compressively contacting said elastic members, whereby gaps are formed between said recording sheets and said substrate wall of said recesses.

* * * * *